(12) United States Patent
Macdonald et al.

(10) Patent No.: US 7,181,748 B2
(45) Date of Patent: *Feb. 20, 2007

(54) MULTI-LAYER PROTOCOL REASSEMBLY THAT OPERATES INDEPENDENTLY OF UNDERLYING PROTOCOLS, AND RESULTING VECTOR LIST CORRESPONDING THERETO

(75) Inventors: Stuart John Macdonald, Littleton, CO (US); Jerome Norman Freedman, Greenbrae, CA (US)

(73) Assignee: Network General Technology, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 11/215,536

(22) Filed: Aug. 29, 2005

(65) Prior Publication Data

US 2006/0031847 A1    Feb. 9, 2006

Related U.S. Application Data

(63) Continuation of application No. 09/678,145, filed on Oct. 3, 2000, now Pat. No. 6,968,554.

(51) Int. Cl.
*G06F 15/16* (2006.01)
(52) U.S. Cl. ...................... 719/316; 709/230
(58) Field of Classification Search ................ 719/316, 719/332; 709/230, 244, 218–224, 227, 231, 709/238, 236; 370/230
See application file for complete search history.

(56) References Cited

U.S. PATENT DOCUMENTS 6,014,709 A    1/2000  Gulick et al.
6,119,170 A    9/2000  Schoffelman et al.
6,122,670 A    9/2000  Bennett et al.
6,697,871 B1   2/2004  Hansen

OTHER PUBLICATIONS

Stevens, W. R., "TCP/IP Illustrated," 1994, pp. 148-151, vol. 1, Addison Wesley.

*Primary Examiner*—Krisna Lim

(74) *Attorney, Agent, or Firm*—Fenwick & West LLP

(57) ABSTRACT

A segmentation and re-assembly (SAR) decode engine receives protocol data units of data from a communication channel between two computers, sequences the protocol data units, and re-assembles the data in the protocol data units into the messages exchanged by the computers. The SAR decode engine is responsible for unpacking the payloads from the protocol data units as instructed by a protocol interpreter associated with the protocol data unit, and for creating and maintaining a flow object database containing flow objects representing the data flows at each protocol layer. The SAR decode engine creates a protocol flow object for each protocol layer and logically links the protocol flow object to circuit flow objects that define two one-way circuits within the channel. The circuit flow objects linked to a protocol flow object are logical representations of the protocol data units for the next higher protocol layer. For protocols that fragment data, each circuit flow object is a vector list containing one or more vectors that define the length, starting location and position of the data fragments in the immediately lower layer circuit flow objects.

14 Claims, 9 Drawing Sheets

MULTI-LAYER PROTOCOL REASSEMBLY THAT OPERATES INDEPENDENTLY OF UNDERLYING PROTOCOLS, AND RESULTING VECTOR LIST CORRESPONDING THERETO

This application is a Continuation of U.S. patent application Ser. No. 09/678,145, filed on Oct. 3, 2000, now U.S. Pat. No. 6,968,554, which is incorporated herein by reference in its entirety.

FIELD OF THE INVENTION

This invention relates generally to computer networks, and more particularly to reassembling protocol data flows within a computer network.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 1999, Network General Corporation, All Rights Reserved.

BACKGROUND OF THE INVENTION

Communication links between two computers on a network, such as the Internet or a local-area network, are subject to various types of degradation and failure conditions. Protocol analysis is frequently used to determine where potential problems exist in a network. Each network protocol requires the development of a protocol interpreter designed around the characteristics of a particular protocol. Because a network may implement one or more of the over 430 communication protocols currently in common use, a general purpose protocol analysis system must incorporate many individual protocol interpreters.

Although the characteristics of each protocol are different, certain operations in performing protocol analysis are common, such as parsing a protocol data unit to extract a payload. Having a generalized base model for the common operations would save development time in creating the protocol interpreters and reduce the complexity of a general purpose protocol analysis system.

SUMMARY OF THE INVENTION

The above-mentioned shortcomings, disadvantages and problems are addressed by the present invention, which will be understood by reading and studying the following specification.

A segmentation and re-assembly (SAR) decode engine reassembles messages from protocol data units exchanged in a communications channel between two computers. The SAR decode engine creates a protocol flow object to represent each protocol layer used in the communications channel. Each of the protocol flow objects has a primary and an alternate circuit element to which are linked circuit flow objects representing protocol data units for the next higher protocol, and the circuit flow objects are linked to the circuit element corresponding to the transmission direction in the channel of the protocol data units represented by the circuit flow objects. The SAR decode engine logically arranges the protocol flow objects in a tree structure corresponding to a hierarchical arrangement of the protocol layers used in the channel. The SAR decode engine logically links the circuit flow objects in a sequence when specified by the associated protocol. The messages in the channel are reassembled from the circuit flow objects linked to the protocol flow object that represents the top layer protocol. The SAR decode engine stores the protocol and circuit flow objects in a database. In one aspect, vector lists are used for circuit flow objects to represent protocol data units that are the result of fragmenting a protocol data unit from a higher layer protocol.

The SAR decode engine of the present invention provides generalized parsing and decoding functions that were previously required to be individually coded in each protocol interpreter. The SAR decode engine also manages data flow storage structures that are common for all protocol interfaces, further reducing the complexity of the individual protocol interpreter and eliminating the need for specialized interfaces previously required to pass data from layer to layer. Because the common functions and storage structures are centralized in the SAR decode engine, the operations can be optimized to improve the overall performance of a protocol analysis system that incorporates the present invention.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

DETAILED DESCRIPTION OF THE INVENTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

The detailed description is divided into four sections and a conclusion. In the first section, the hardware and the operating environment in conjunction with which embodiments of the invention may be practiced are described. In the second section, a system level overview of the invention is presented. In the third section, methods for an embodiment of the invention are provided. In the fourth section, a particular implementation of the invention is described.

Operating Environment

Figure 1:
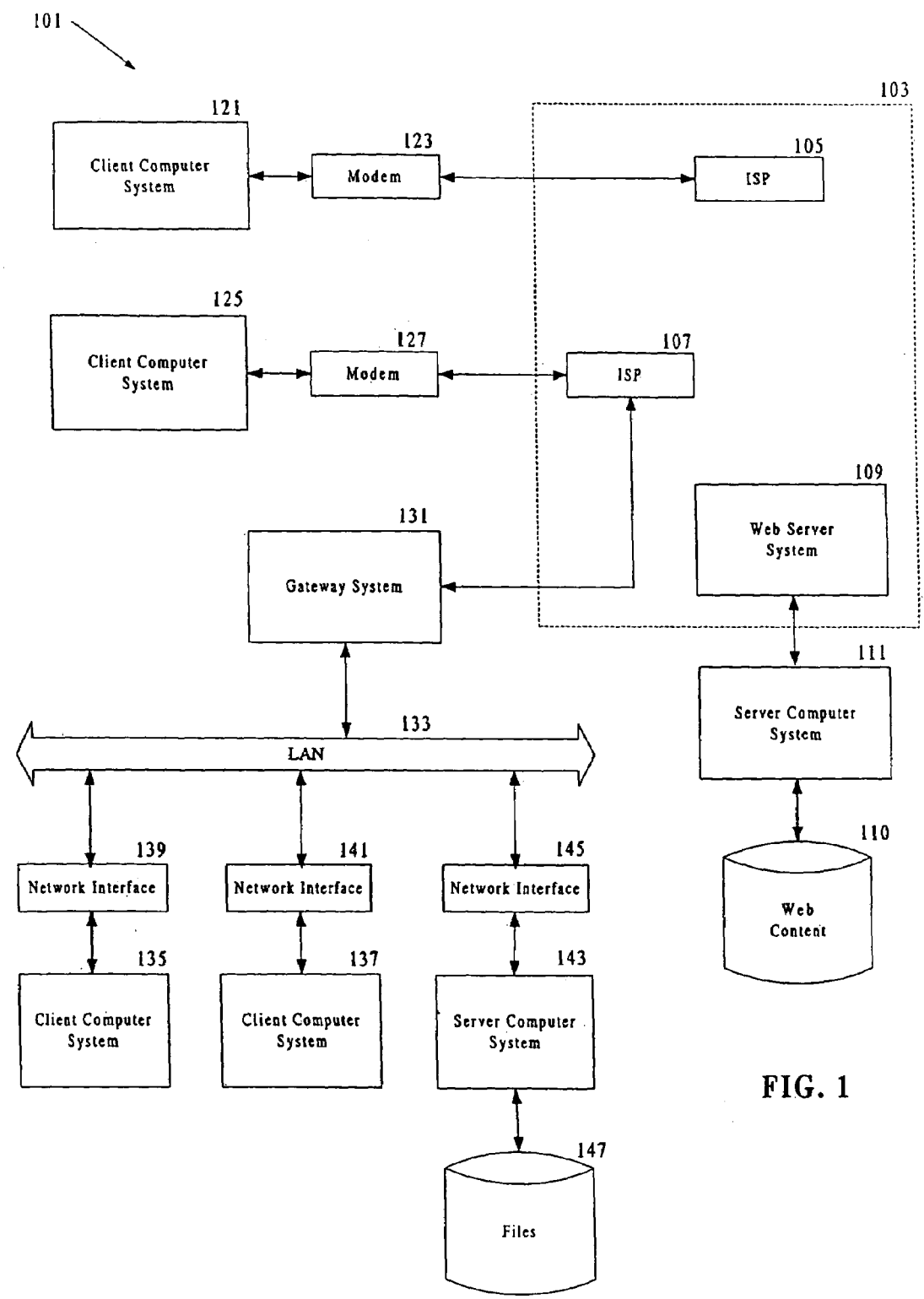
FIG. 1 is a diagram of one embodiment of an operating environment suitable for practicing the present invention.
Figure 2:
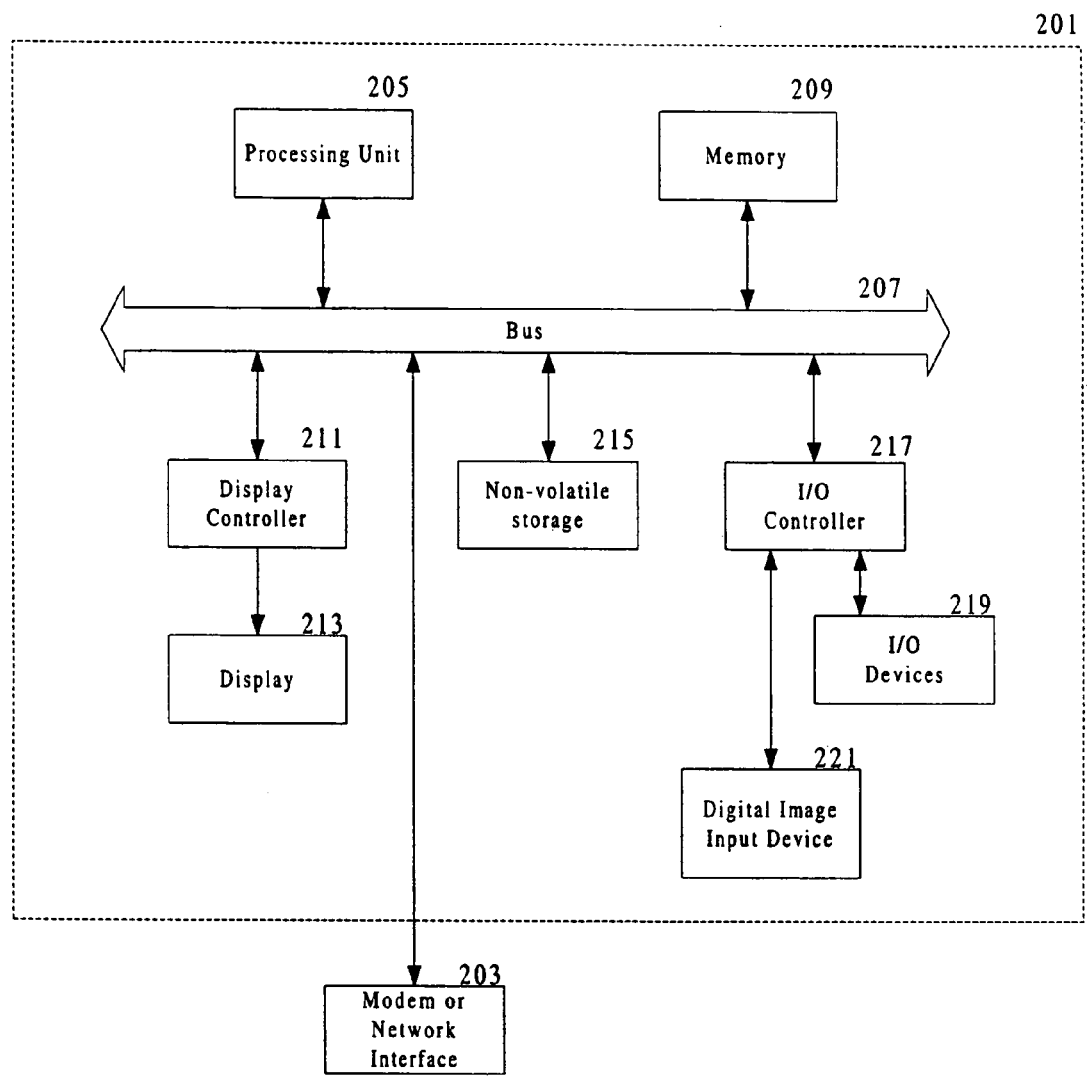
FIG. 2 is a diagram of one embodiment of a computer system suitable for use in the operating environment of FIG. 1.

The following description of FIGS. 1 and 2 is intended to provide an overview of computer hardware and other operating components suitable for implementing the invention, but is not intended to limit the applicable environments. One of skill in the art will immediately appreciate that the invention can be practiced with other computer system configurations, including hand-held devices, multiprocessor systems, microprocessor-based or programmable consumer electronics, network PCs, minicomputers, mainframe computers, and the like. The invention can also be practiced in distributed computing environments where tasks are performed by remote processing devices that are linked through a communications network.

FIG. 1 shows several computer systems that are coupled together through a network 103, such as the Internet. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (web). The physical connections of the Internet and the protocols and communication procedures of the Internet are well known to those of skill in the art. Access to the Internet 103 is typically provided by Internet service providers (ISP), such as the ISPs 105 and 107. Users on client systems, such as client computer systems 121, 125, 135, and 137 obtain access to the Internet through the Internet service providers, such as ISPs 105 and 107. Access to the Internet allows users of the client computer systems to exchange information, receive and send e-mails, and view documents, such as documents which have been prepared in the HTML format. These documents are often provided by web servers, such as web server 109 which is considered to be "on" the Internet. Often these web servers are provided by the ISPs, such as ISP 105, although a computer system can be set up and connected to the Internet without that system being also an ISP as is well known in the art.

The web server 109 is typically at least one computer system which operates as a server computer system and is configured to operate with the protocols of the World Wide Web and is coupled to the Internet. Optionally, the web server 109 can be part of an ISP which provides access to the Internet for client systems. The web server 109 is shown coupled to the server computer system 111 which itself is coupled to web content 110, which can be considered a form of a media database. It will be appreciated that while two computer systems 109 and 111 are shown in FIG. 1, the web server system 109 and the server computer system 111 can be one computer system having different software components providing the web server functionality and the server functionality provided by the server computer system 111 which will be described further below.

Client computer systems 121, 125, 135, and 137 can each, with the appropriate web browsing software, view HTML pages provided by the web server 109. The ISP 105 provides Internet connectivity to the client computer system 121 through the modem interface 123 which can be considered part of the client computer system 121. The client computer system can be a personal computer system, a network computer, a Web TV system, or other such computer system. Similarly, the ISP 107 provides Internet connectivity for client systems 125, 135, and 137, although as shown in FIG. 1, the connections are not the same for these three computer systems. Client computer system 125 is coupled through a modem interface 127 while client computer systems 135 and 137 are part of a LAN. While FIG. 1 shows the interfaces 123 and 127 as generically as a "modem," it will be appreciated that each of these interfaces can be an analog modem, ISDN modem, cable modem, DSL (digital subscriber line) router, satellite transmission interface (e.g. "Direct PC"), or other interfaces for coupling a computer system to other computer systems. Client computer systems 135 and 137 are coupled to a LAN 133 through network interfaces 139 and 141, which can be Ethernet network or other network interfaces. The LAN 133 is also coupled to a gateway computer system 131 which can provide firewall and other Internet related services for the local area network. This gateway computer system 131 is coupled to the ISP 107 to provide Internet connectivity to the client computer systems 135 and 137. The gateway computer system 131 can be a conventional server computer system. Also, the web server system 109 can be a conventional server computer system.

Alternatively, as is well-known, a server computer system 143 can be directly coupled to the LAN 133 through a network interface 145 to provide files 147 and other services to the clients 135, 137, without the need to connect to the Internet through the gateway system 131.

FIG. 2 shows one example of a conventional computer system that can be used as a client computer system or a server computer system or as a web server system. It will also be appreciated that such a computer system can be used to perform many of the functions of an Internet service provider, such as ISP 105. The computer system 201 interfaces to external systems through the modem or network interface 203. It will be appreciated that the modem or network interface 203 can be considered to be part of the computer system 201. This interface 203 can be an analog modem, ISDN modem, cable modem, DSL router, token ring interface, satellite transmission interface (e.g. "Direct PC"), or other interfaces for coupling a computer system to other computer systems. The computer system 201 includes a processor 205, which can be a conventional microprocessor such as an Intel Pentium microprocessor or Motorola Power PC microprocessor. Memory 209 is coupled to the processor 205 by a bus 207. Memory 209 can be dynamic random access memory (DRAM) and can also include static RAM (SRAM). The bus 207 couples the processor 205 to the memory 209 and also to non-volatile storage 215 and to display controller 211 and to the input/output (I/O) controller 217. The display controller 211 controls in the conventional manner a display on a display device 213 which can be a cathode ray tube (CRT) or liquid crystal display. The input/output devices 219 can include a keyboard, disk drives, printers, a scanner, and other input and output devices, including a mouse or other pointing device. The display controller 211 and the I/O controller 217 can be implemented with conventional well known technology. A digital image input device 221 can be a digital camera which is coupled to an I/O controller 217 in order to allow images from the digital camera to be input into the computer system 201. The non-volatile storage 215 is often a magnetic hard disk, an optical disk, or another form of storage for large amounts of data. Some of this data is often written, by a direct memory access process, into memory 209 during execution of software in the computer system 201. One of skill in the art will immediately recognize that the term "computer-readable medium" includes any type of storage device that is accessible by the processor 205 and also encompasses a carrier wave that encodes a data signal.

It will be appreciated that the computer system 201 is one example of many possible computer systems which have different architectures. For example, personal computers based on an Intel microprocessor often have multiple buses, one of which can be an input/output (I/O) bus for the peripherals and one that directly connects the processor 205 and the memory 209 (often referred to as a memory bus). The buses are connected together through bridge components that perform any necessary translation due to differing bus protocols.

Network computers are another type of computer system that can be used with the present invention. Network computers do not usually include a hard disk or other mass storage, and the executable programs are loaded from a network connection into the memory 209 for execution by the processor 205. A Web TV system, which is known in the art, is also considered to be a computer system according to the present invention, but it may lack some of the features shown in FIG. 2, such as certain input or output devices. A typical computer system will usually include at least a processor, memory, and a bus coupling the memory to the processor.

It will also be appreciated that the computer system 201 is controlled by operating system software which includes a file management system, such as a disk operating system, which is part of the operating system software. One example of an operating system software with its associated file management system software is the operating system known as Windows '95® from Microsoft Corporation of Redmond, Wash., and its associated file management system. The file management system is typically stored in the non-volatile storage 215 and causes the processor 205 to execute the various acts required by the operating system to input and output data and to store data in memory, including storing files on the non-volatile storage 215.

System Level Overview

A system level overview of the operation of an embodiment of a segmentation and re-assembly (SAR) decode engine according to the invention is described by reference to FIGS. 3, 4A, 4B, 5A and 5B. Beginning with FIG. 3, a communication channel 320 is established between two computers, computer A 301 and computer B 303. Computer B 303 can be a client, such as client computer systems 121, 125, 135, 137 in FIG. 2, connected through the Internet 103 or LAN 133 (the communications channel 320) to computer A 301 functioning as a server such as server computer systems 111 or 143. As is conventional, the data flowing through the communication channel 320 is encoded into "protocol data units" according to a multi-layered data communication protocol, such as defined in the OSI (Open Systems Interconnection) model. Frequently, protocol data units exchanged at the lowest protocol layer are referred to as "frames," while those at the higher protocol layers are referred to as "packets." For simplicity in describing the invention, the data exchanged at all layers is referred to herein as protocol data units or PDUs, and such usage is further clarified with the number or name of the corresponding protocol layer when appropriate.

Protocol data units in the communications channel 320 are captured in a frame capture buffer 305 and retrieved by the SAR decode engine 307. Multiple protocol interpreters, collectively shown at 311, are used by the SAR decode engine 307 to determine the appropriate sequencing or reassembly of the data into the data flow recognized by a particular protocol layer. The SAR decode engine 307 creates various flow objects to represent the data flows at each level and stores the flow objects in a flow object database 309 as described next. The SAR decode engine 307 is also responsible for unpacking the PDUs in creating the flow objects, thus eliminating the need for each of the protocol interpreters 311 to contain code that does the repetitive unpacking operations.

Figure 4A:
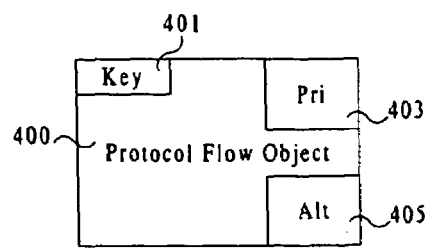
FIG. 4A is a diagram of a protocol flow object data structure for use in an embodiment of the invention.

The SAR decode engine 307 creates protocol flow objects to represent the protocol layers in the communication channel 320 and circuit flow objects to represent the data as it is decoded by the protocols at each level. One embodiment of a protocol flow object data structure is shown in FIG. 4A. The protocol flow object 400 contains a key 401 used to identify the particular protocol flow object within the flow object database 309. The protocol flow object 401 also contains two circuit elements that link the circuit flow objects to the protocol flow object 401. A primary circuit element 403 is linked to a series of circuit flow objects that represent the data being transmitted in one direction between the computers 301 and 303 and define a one-way circuit 321 in the communications channel 320. An alternate circuit element 405 is linked to a series of circuit flow objects that define the opposite circuit 323 within the channel 320. In the present embodiment, the primary circuit is determined by the transmission direction of the first protocol data unit that is received in the frame capture buffer but it will be appreciated that the primary and alternate circuits can be pre-determined based on various criteria, such as the whether the source computer functions as the client or server in a client-server network. It will further be appreciated that the key and the logical links can be address pointers, hash table values, or similar data structures conventionally used to locate and relate records within a data base or other data organization. For example, in the implementation discussed further below, a hash table is used.

The protocol flow objects created for the channel 320 are logically linked together by the SAR decode engine 470 in a hierarchical flow tree data structure. Using an Ethernet network and the standard TCP/IP protocol stack as an example, a corresponding flow tree 420 shown in FIG. 4B has at its base a root flow object 421, which is linked to a data link layer protocol flow object, shown as DLC protocol object 423. The network layer protocol is the Internet Protocol (IP) and is represented in the tree 420 by the IP protocol flow object 425. In the present example, there are two connections between the computers at the transport protocol layer, one for retrieving HTML formatted web pages using the HTTP application protocol and one for retrieving data from a Microsoft SQL database using a tabular data stream (TDS) protocol. Therefore, two TCP protocol flow objects are created at the transport layer and linked to the IP protocol flow object 425 in the tree 420, one for each connection. TCP protocol flow object 427 represents the connection between the two computers used to transport the requests for web pages and the corresponding web pages, while TCP protocol flow object 429 represents the connection that transports the SQL commands and resulting data. Similarly, there are two protocol flow objects at the application protocol level of the tree 420, an HTTP protocol flow object 431 and a MS SQL protocol flow object 433, linked to their respective TCP protocol objects.

The key 401 for each protocol object may be either a source identifier when it alone is sufficient to specify the appropriate protocol object, or a combination of both source and destination identifiers. One of in the art will immediately recognize that the tree 420 shown in FIG. 4B is a simplified version of the types of hierarchical flow trees that can be created for the connections between two computers.

Figure 3:
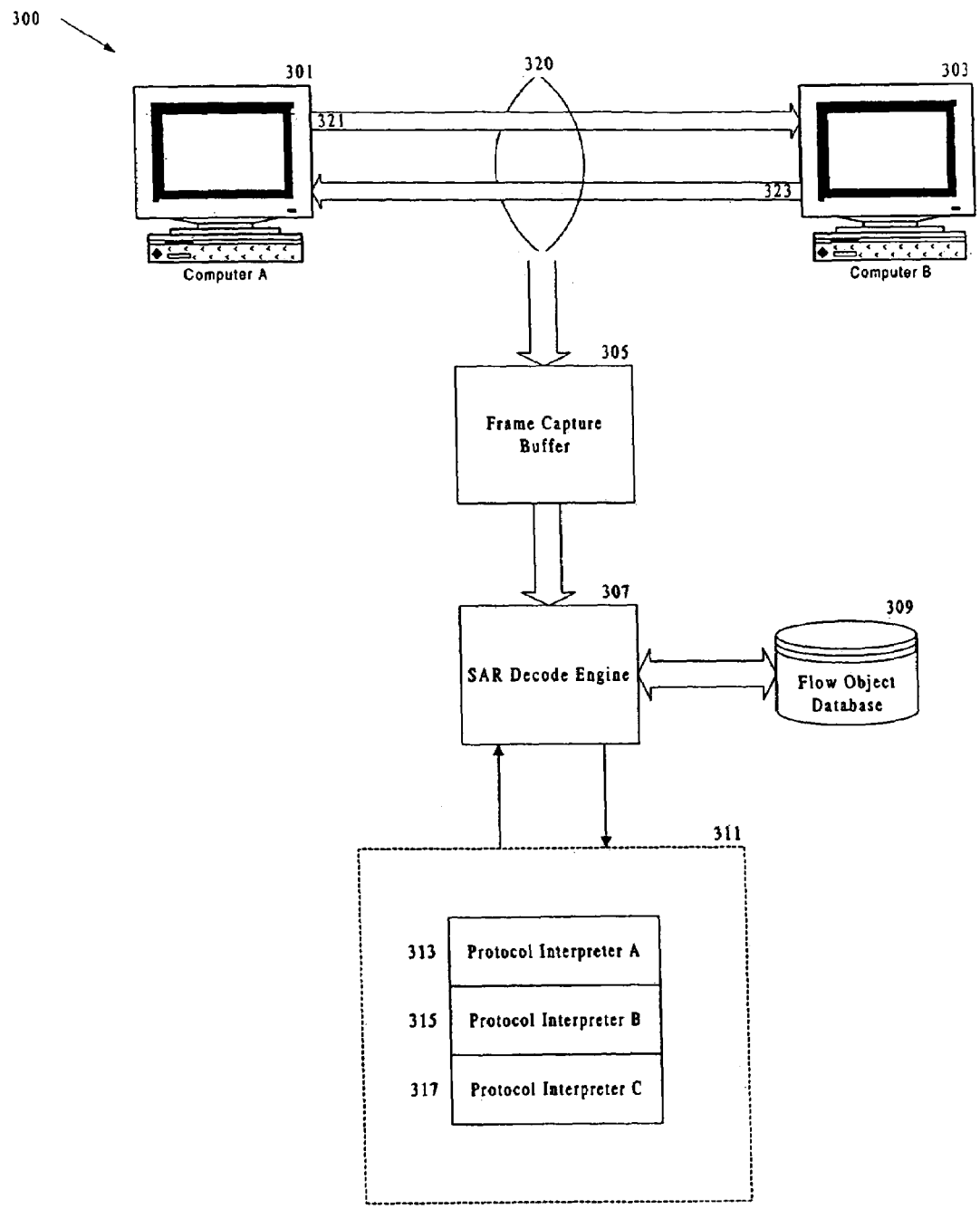
FIG. 3 is a diagram illustrating a system-level overview of an embodiment of the invention.
Figure 4B:
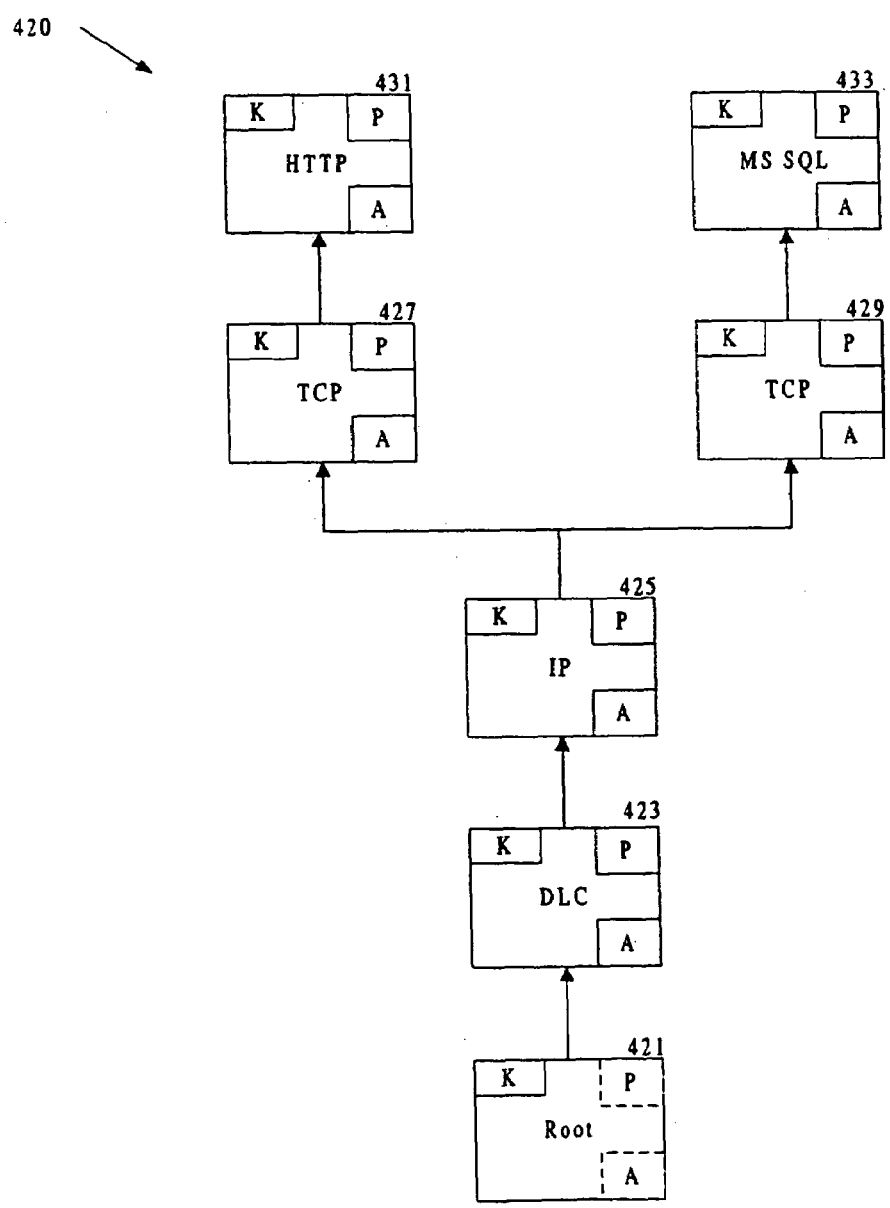
FIG. 4B is a diagram of flow tree data structure for use in an embodiment of the invention.

Although not illustrated in FIG. 4B, each of the protocol flow objects in the tree 420 is further linked to the circuit flow objects that represent the primary and alternate circuits of the connection at that level. The circuit flow objects linked to a protocol flow object for a particular protocol layer represent the payloads of the protocol data units for that layer. The configuration of the circuit flow object depends upon the characteristics of the associated protocol layer. FIG. 3 is used in conjunction with FIGS. 5A and 5B to describe examples of the circuit flow objects created by the SAR decode engine 307 for each protocol layer in a simplified three-layer protocol stack corresponding to protocol interpreter A 313, protocol interpreter B 315, and protocol interpreter C 317 in FIG. 3.

At the source computer, the top layer protocol A receives a message 501 from an application. Protocol A appends a header 505 to the message 501 to create a protocol A PDU 503. The protocol A PDU 503 is then fragmented by the middle layer protocol B into three protocol B PDUs 513, 515, 517. Protocol B PDU 513 contains a header 519, with the first portion of the message 507 as its payload 521. Protocol B PDU 515 contains a header 523 and a second portion of the message 509 as its payload 525. Similarly, the final protocol B PDU 517 contains a header 527 and the final portion of the message 511 as its payload 529. The protocol B PDUs 513, 515, 517 are transmitted over the communication channel 320 by the bottom layer protocol C as protocol C PDUs. For ease in illustration, the protocol C PDUs are not shown and assumed to have a one-to-one correspondence to the protocol B PDUs 513, 515, 517.

The SAR decode engine 307 retrieves the first protocol C PDU, i.e., having the protocol B PDU 513 in its payload, from the frame capture buffer 305 and determines the lowest level protocol is protocol C. The SAR decode engine 307 creates a root protocol flow object and protocol flow object for protocol C if they do not already exist. The SAR decode engine calls protocol interpreter C 317 and creates a circuit flow object 531 corresponding to protocol B PDU 513 from the payload of the protocol C PDU. The remaining protocol C PDUs are retrieved from the frame capture buffer 305 and passed to the protocol interpreter C 317 one at a time. As instructed by the protocol interpreter C 317, the SAR decode engine creates circuit flow objects 533, 537 from the payloads extracted from the remaining protocol C PDUs. In one embodiment, an extracted PDU is stored as a record within the flow object database 309 along with an identifier, while in another embodiment the extracted PDU is held in a data buffer and accessed by its address within the data buffer.

Other alternate embodiments of the circuit flow objects for a non-fragmented protocol will be readily apparent to one of skill in the art and are considered within the scope of the invention.

The protocol interpreter C 317 also specifies a sequence order for the protocol C PDUs and the SAR decode engine links the circuit flow objects 531, 533, 535 in the specified order as shown by single arrows 537 and 539. Thus, the linked circuit flow objects 531, 533, 535 represent a linked list of protocol B PDUs 513, 515, 517 that form one of the circuits 321 or 323 in the communications channel 320. The protocol interpreter C 317 also informs the SAR decode engine that the middle layer protocol is protocol B.

Figure 5A:
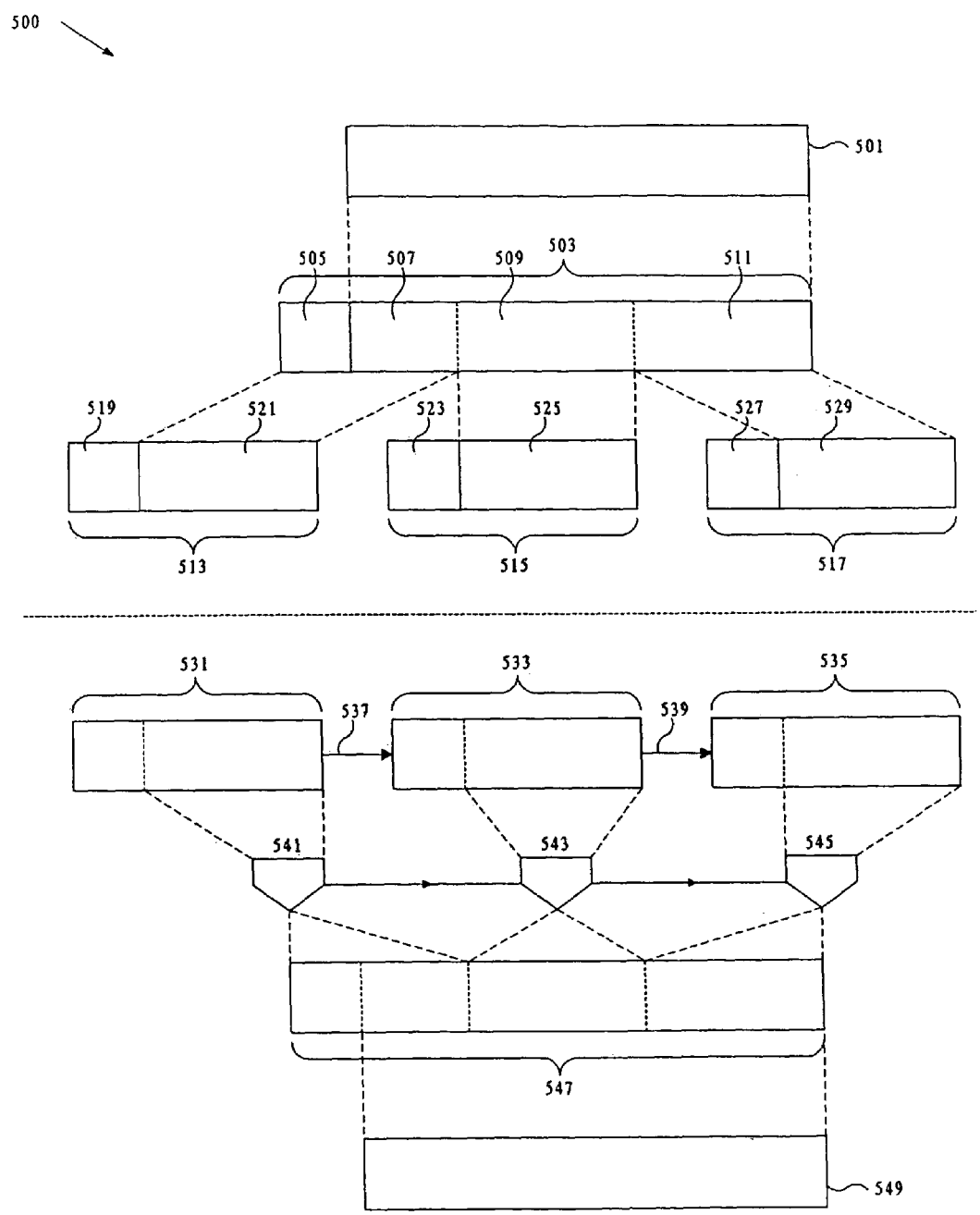
FIG. 5A is a diagram illustrating circuit flow objects created by an embodiment of the invention.
Figure 5B:
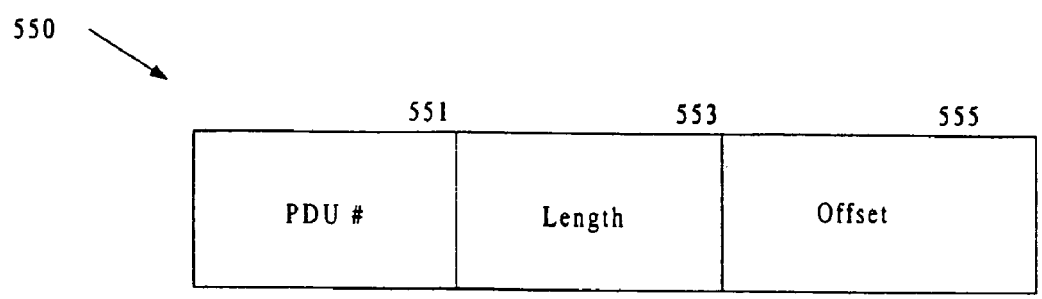
FIG. 5B is a diagram illustrating an embodiment of a vector for a circuit flow object in FIG. 5A.

Because the original protocol A PDU 503 was fragmented by protocol B, the circuit flow object linked to the protocol flow object for protocol B is a vector list containing vectors 541, 543, 545 that locate the fragments of the PDU 503 within the circuit flow objects 531, 533, 535. The vectors 541, 543,545 are formatted as shown in FIG. 5B. Each vector consists of the number 551 of the corresponding protocol B PDU, a length 553 of the fragment contained in the protocol B PDU (in bytes), and an offset 555 for the beginning of the fragment within the protocol B PDU. The information for the vectors is obtained by the SAR decode engine 307 by calling the protocol interpreter B 515 and passing in the circuit flow objects 531, 533, 535 in sequence order. The vector list is then linked to the protocol flow object for protocol B. Protocol interpreter B 5 15 designates protocol A as the next protocol layer.

Now, the SAR decode engine 307 can reassemble the original message 501. The SAR decode engine 307 extracts the data from the circuit flow objects 531, 533, 535 as specified by the vectors 541, 543, 545 into a re-assembly buffer 547. The SAR decode engine 307 calls the protocol interpreter A 3 13, passing in the re-assembly buffer 547. The protocol interpreter A 313 returns instructions to the SAR decode engine 307 on how extract the message 501 from the re-assembly buffer 547. A flow object 549 containing the message 501 is linked to the protocol flow object for protocol A.

The system level overview of the operation of an embodiment of the invention has been described in this section of the detailed description. A segmentation and reassembly (SAR) decode engine receives protocol data units from a communication channel between two computers, sequences the protocol data units, and re-assembles the data in the protocol data units into the messages exchanged by the computers. The SAR is responsible for unpacking the payloads from the protocol data units as instructed by a protocol interpreter associated with the protocol layer that created the protocol data units, and for creating and maintaining a flow object database that holds flow objects representing the data flows at each protocol layer. The flow objects are arranged in a hierarchical flow tree data structure corresponding to the layers in the protocol stack. The flow objects at the top of the tree are used to re-assemble the messages. While the invention is not limited to any particular configuration of data structures, sample embodiments of flow objects and flow trees have been described. For example, one of skill in the art will readily appreciate that the circuit flow objects may contain pointers to the corresponding lowest layer protocol data units captured within the frame buffer and offset information for parsing the protocol data units at the various protocol layers instead of containing the actual payloads of the protocol data units as extracted by the SAR.

Methods of Embodiments of the Invention

In the previous section, a system level overview of the operations of embodiments of the invention was described. In this section, the particular methods of the invention are described in terms of computer software with reference to a series of flowcharts. The methods to be performed by a computer constitute computer programs made up of computer-executable instructions. Describing the methods by reference to a flowchart enables one skilled in the art to develop such programs including such instructions to carry out the methods on suitably configured computers (the processor of the computer executing the instructions from computer-readable media). The computer-executable instructions may be written in a computer programming language or may be embodied in firmware logic. If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application, module, logic . . . ), as taking an action or causing a result. Such expressions are merely a shorthand way of saying that execution of the software by a computer causes the processor of the computer to perform an action or a produce a result.

Figure 6A:
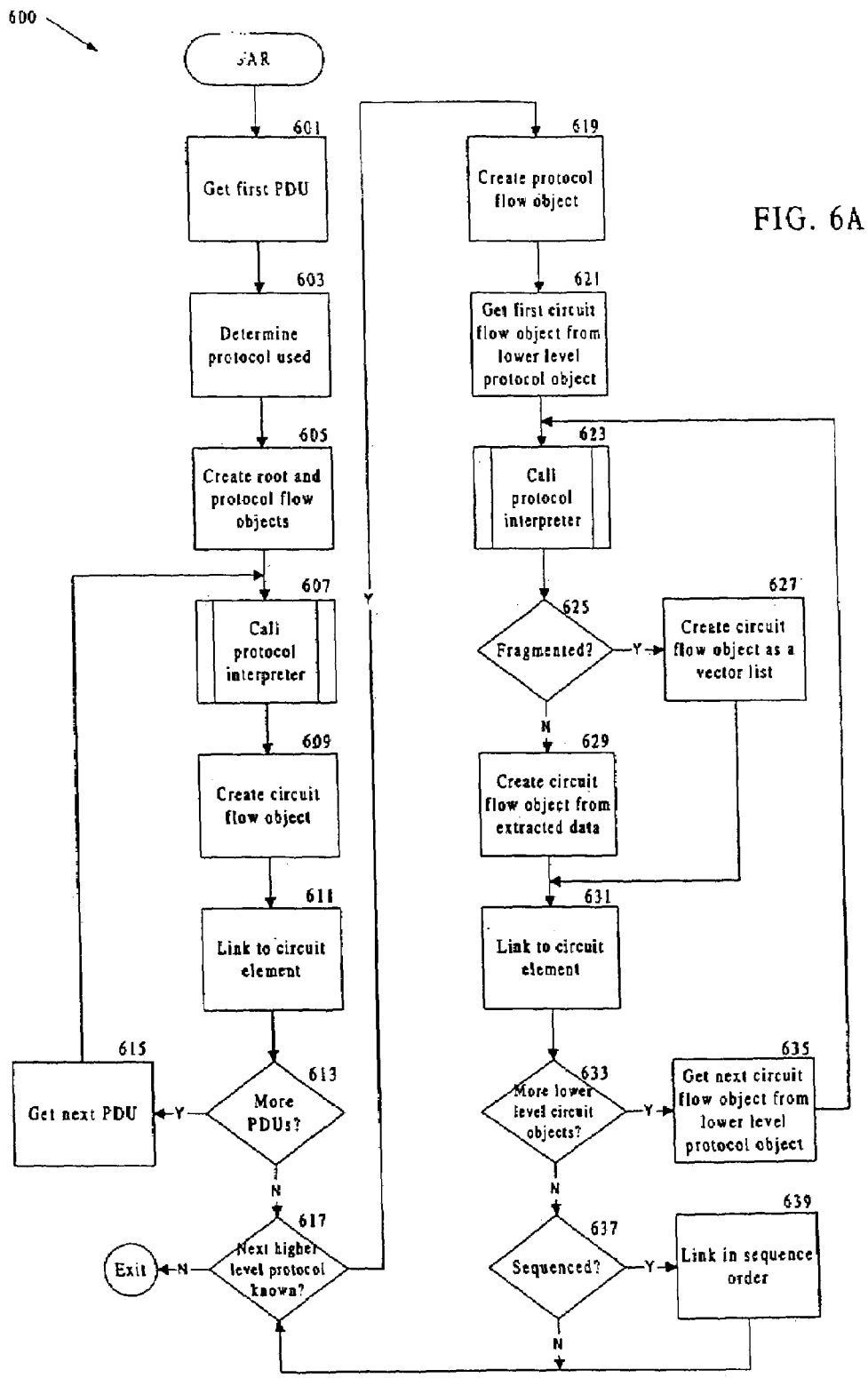
FIGS. 6A–B are flowchart of methods to be performed by a computer according to an embodiment of the invention.
Figure 7:
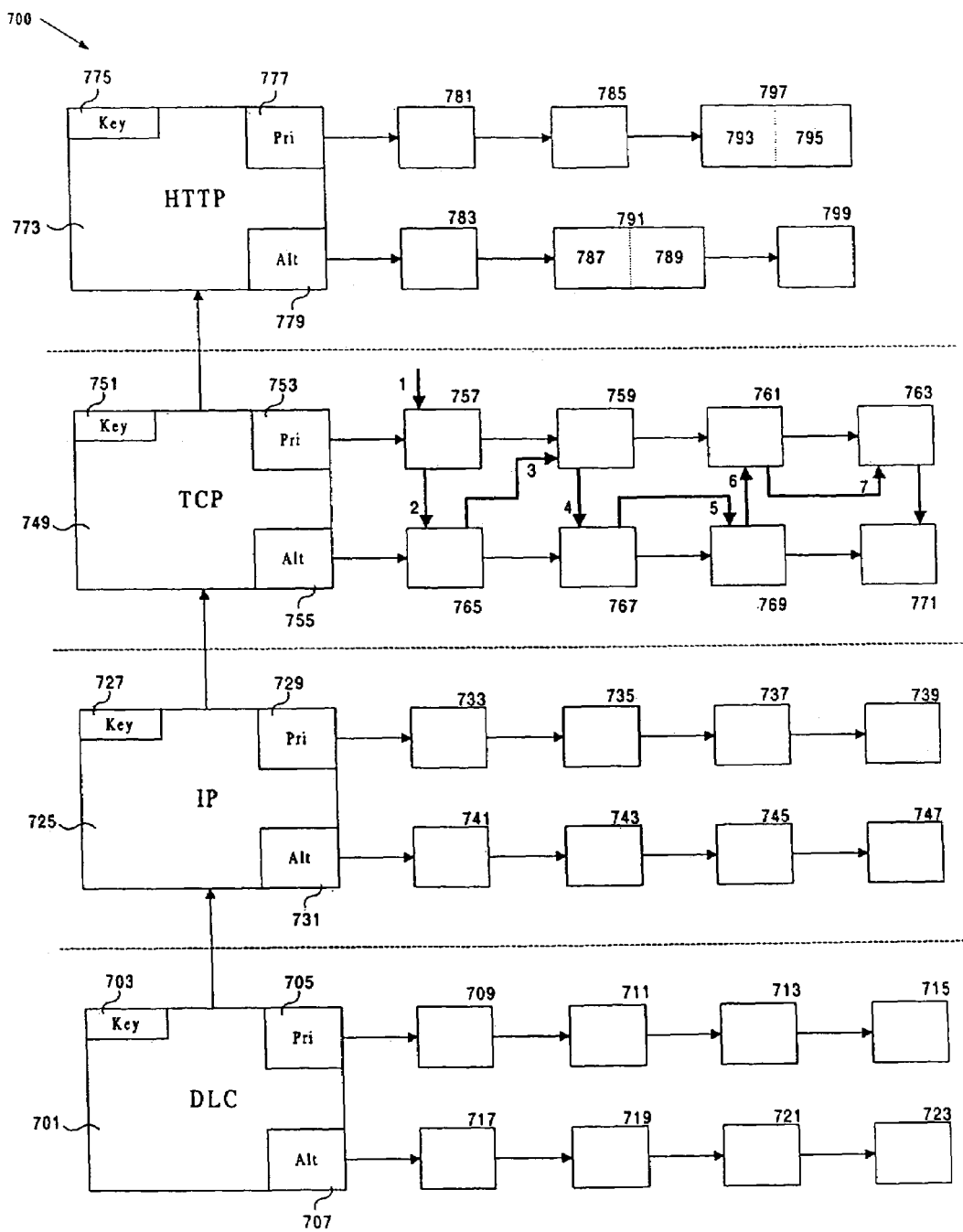
FIG. 7 is a diagram illustrating an example of a flow tree created by the method of FIG. 6A.

Turning now to FIG. 6A, the acts to be performed by a computer executing one embodiment of an SAR method 600 are shown and described with further reference to FIG. 7 that illustrates a protocol tree created by the SAR method 600. The root flow object has been omitted from FIG. 7 for ease in illustration. In general, each protocol interpreter called by the SAR method 600 returns instructions that direct the SAR method 600 in extracting the payload from each circuit flow object created by the immediate lower layer protocol. Additionally, the protocol interpreter for a protocol N that fragments the protocol data units from the higher layer N+1 specifies the position of the fragments within the N+1 PDU. Protocol interpreters may also specify the sequence in which the circuit flow objects must be processed by the next higher layer protocol. Although not shown or described in this section, one of skill in the art will immediately recognize that various error recovery functions can be incorporated into the SAR method 600 to handle transmission problems at the lowest protocol level, such as out-of-sequence frames, duplicated/retransmitted frames, missing frames and the like.

The protocol tree in FIG. 7 assumes an Ethernet network running TCP/IP and an HTTP connection between the two computers. The HTTP protocol layer fragments data that is greater than a pre-defined length and creates multiple HTTP PDUs, each having a fragment as its payload, to hold the data. The HTTP protocol designates each PDU as a first, last, or middle PDU when the data is spread over multiple PDUs, i.e., multi-PDU data, or as a single PDU if the data is unfragmented, single-PDU data. For simplicity in explanation, it is assumed that neither the TCP nor IP protocol layers fragment PDUs from a higher layer, but that the TCP protocol layer does sequence the PDUs it receives from the HTTP layer. The protocol flow objects in FIG. 7 are keyed as shown in Table 1.

TABLE 1

Example Protocol Layers and Keys

| Layer | Protocol | Key | Example |
|---|---|---|---|
| Data Link | Ethernet (DLC) | Source & destination NIC addresses (key 703) | Computer A: D5C3FF (6 bytes) Computer B: 29D0A6 |
| Network | IP | Source & destination IP addresses (key 727) | A: 161.69.10.165 (4 bytes) B: 161.69.10.164 |
| Transport | TCP | Source & destination port addresses (key 751) | A: 80 (2 bytes) B: 1908 |
| Application | HTTP | Source port (key 775) | A: 1908 (2 bytes) |

The SAR method 600 retrieves the first Ethernet PDU from a capture memory, a trace file, or similar frame buffering facility (block 601) and examines the Ethernet PDU header to determine the protocol used at the data link layer (block 603). In an alternate embodiment, the SAR method 600 obtains a range of Ethernet PDU numbers that are to be processed and retrieves each Ethernet PDU in turn by number. The SAR method 600 creates a root flow object and a protocol flow object for the data link layer protocol (block 605), shown in FIG. 7 as DLC protocol flow object 701. The SAR method 600 calls the DLC protocol interpreter specific to the Ethernet protocol with the first Ethernet PDU (block 607). The payload from the first Ethernet PDU is extracted according to the instructions returned from the DLC protocol interpreter and used to create a first circuit flow object 709 (block 609). The circuit flow object 709 is linked to the primary circuit element 705 (block 611) since in this embodiment, the first PDU received defines the primary circuit. If more Ethernet PDUs remain in the frame buffer (block 613), each is retrieved and passed into the protocol interpreter at block 607 and the cycle repeats until the SAR has created a circuit flow object from each Ethernet PDU in the frame buffer, e.g., circuit flow objects 709, 711, 713, 715, 717, 719, 721, 723, and linked the circuit flow objects into the appropriate circuit element 705, 707. If the current protocol interpreter has not specified the protocol for the next layer (block 617), the SAR method 600 exits.

Assuming that the DLC protocol interpreter has designated IP as the network layer, the SAR method 600 creates an IP protocol flow object 725 (block 619), retrieves the first circuit flow object 709 (block 621), and calls the IP protocol interpreter (block 623), passing in the circuit flow object 709. In the present example, the IP protocol does not fragment TCP PDUs (block 625), so the SAR method 600 creates a circuit flow object 733 from the payload in the circuit flow object 709 (block 629). The SAR method 600 links the circuit flow object 733 to the primary circuit element 729 in the IP protocol flow object (block 631). The creation and linking process is repeated for each circuit flow object linked to the DLC protocol flow object 725 (blocks 623 and 635), resulting in circuit flow objects 733, 735, 737, 739, 741, 743, 745, 747 that correspond to the payloads of circuit flow objects 709, 711, 713, 715, 717, 719, 721, 723. The circuit flow objects 733, 735, 737, 739, 741, 743, 745, 747 are linked into the circuit elements 729, 731 in the IP protocol flow object 725 in an order corresponding to the order of the circuit flow objects 709, 711, 713, 715, 717, 719, 721, 723. The IP protocol interpreter also specifies TCP as the protocol for the next higher layer, i.e., the transport layer, so the test at block 617 returns control to block 619 to process the TCP protocol layer.

The SAR method 600 creates a TCP protocol flow object 749 at block 691, retrieves the first circuit flow object 733 at block 621, and calls the TCP protocol interpreter at block 523. The SAR method creates a circuit flow object 757 from the payload in the circuit flow object 733 at block 629 and links the circuit flow object 757 to the primary circuit element 753 in the TCP protocol flow object 749 at block 631. Remembering that the TCP protocol layer sequences HTTP PDUs (block 637), when all circuit flow objects at the TCP level have been created from the corresponding circuit flow objects at the IP level and linked to the appropriate circuit element, the SAR method creates sequence links 1, 2, 3, 4, 5, 6, 7 and 8 to establish the proper sequencing of the circuit flow objects for the next higher layer, i.e., the application layer, at block 639. The TCP protocol interpreter specifies HTTP as the application protocol layer so when the sequencing is complete at bock 639, the test at block 617 returns control to block 619 to process the HTTP protocol layer.

Once the SAR method 600 has created the HTTP protocol flow object 773 at block 619, its passes each circuit flow object 757, 759, 761, 763, 765, 769, 771, 775 to the HTTP protocol interpreter in the order specified by the sequence links so that the circuit flow object 757 is processed first, the circuit flow object 765 is processed second, and so on, with the circuit flow object 771 being processed last. Because the HTTP protocol fragments data, in addition to instructing the SAR method on how to extract the data from the circuit flow objects linked to the TCP protocol flow object 749, at block 623 the HTTP protocol interpreter also returns a position designation (first, middle, last, single) for each of the circuit flow objects. The SAR method 600 creates vector lists 781, 783, 785, 791, 797, 799 as circuit flow objects for the HTTP layer (block 627) as follows. For the circuit flow objects 757, 765 and 759, the SAR method 600 creates vector lists 781, 783 and 785, each containing a single vector representing an HTTP PDU that contains unfragmented data. When the SAR method 600 passes the circuit flow object 767 to the HTTP protocol interpreter, the protocol interpreter informs it that circuit flow object 767 is the first PDU of multi-PDU data, so the SAR method creates a vector 787 associated with the HTTP PDU represented by the circuit flow object 767. Next, when the SAR method 600 passes the circuit flow object 769 to the HTTP protocol interpreter, the protocol interpreter informs it that the circuit flow object 769 is the final PDU for the multi-PDU data and the SAR method 600 creates a vector 789 associated with the HTTP PDU represented by the circuit flow object 769. Since all the data fragments have now been received, the SAR method 600 creates the vector list 791 from the vectors 787 and 789 to represent the multi-PDU data. Similarly, the processing of circuit flow objects 761 and 763 result in a vector list 797 containing two vectors 793 and 795. The final circuit flow object 771 is used to create a vector list 799 for the corresponding single-PDU data. Because HTTP is the top protocol layer, once all the vector lists have been created, the test at block 617 is false and the SAR method 600 exits.

Figure 6B:
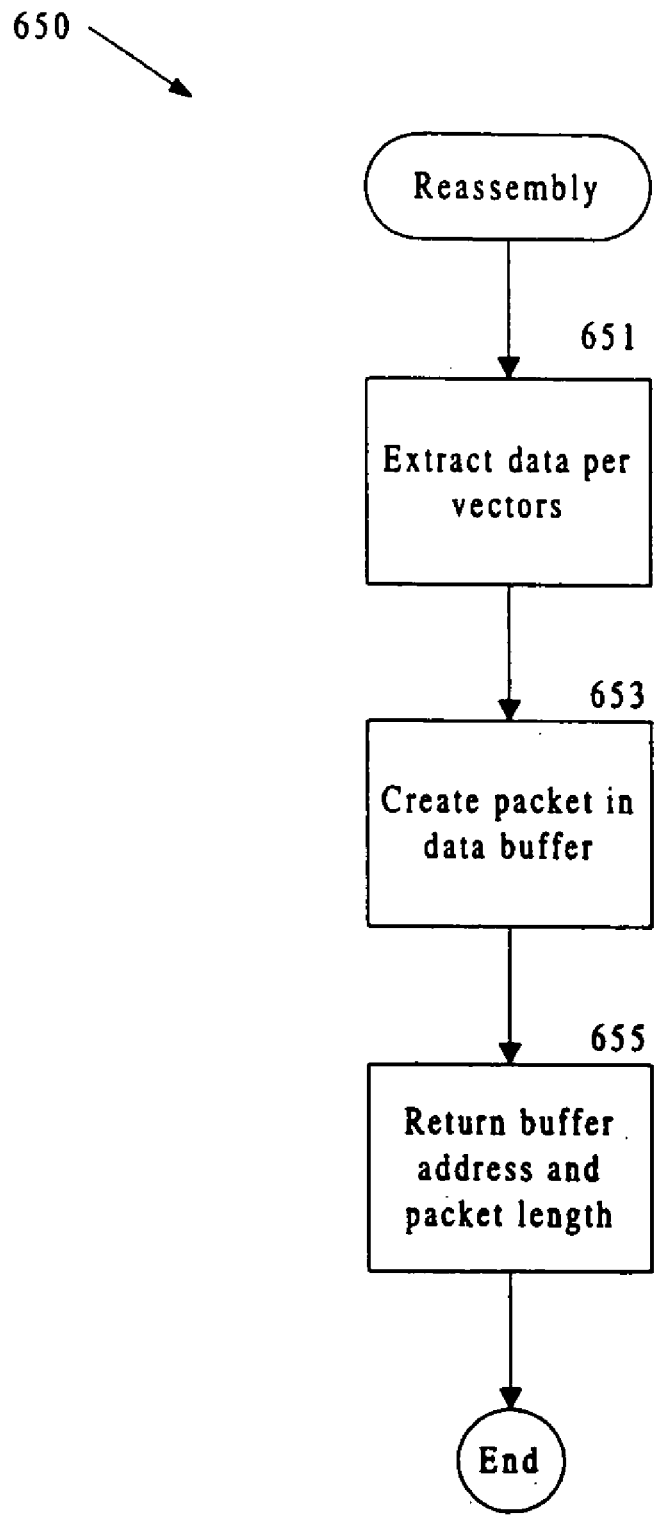

Because vector lists, such as vector lists 781, 783, 785, 791, 797 and 799 in FIG. 7, represent fragmented data, a supporting method illustrated in FIG. 6B is used by the SAR engine to reassemble the data from vector lists. The reassembly method 650 extracts the data fragments from the corresponding PDUs as specified by the information in the vectors in a vector list (block 651) and creates the de-fragmented data in a data buffer (block 653). The buffer address and length of the de-fragmented data is returned to the SAR engine (block 655). If the de-fragmented data represents the actual message exchanged between the computers in the communications channel, no further processing by the SAR engine is necessary. Otherwise, the de-fragmented data is treated as a circuit flow object for a protocol layer N and is used to create the circuit flow object for the protocol layer N+1 as described above in conjunction with FIG. 6A.

The particular method performed by computer when operating as the SAR decode engine in one embodiment have been described. A SAR method performed by the computer has been shown by reference to flowcharts in FIGS. 6A–B including all the acts from 601 until 639 and from 651 until 655, with an example flow tree created by the embodiment of the SAR method shown in FIG. 6A having been illustrated in FIG. 7.

SAR Decode Engine Implementation

In this section of the detailed description, a particular implementation of the SAR decode engine is presented in terms of an application program interface (API), a set of size parameters, and an error handling methodology.

SarAddDu( ) API

The SarAddDu( ) API is used by a protocol interpreter (PI) to instruct the SAR decode engine to extract the payload of a protocol data unit (PDU) to a circuit flow object, to properly sequence the newly added circuit flow object, and to associate that circuit flow object with a given protocol. The arguments for SarAddDu( ) are as follows:

hInterp
    A handle to a particular instance of a data structure, PIINTERP used by the SAR decode engine. There is one PIINTERP per instance of SAR. This data consists of generic information set up by each protocol, parse information to enable protocols to complete their tasks, and PDU data.
uOffset
    Offset of the data relative to the start of the start of the possibly reassembled data.
uTotalLength
    Total Length of PDU(optional). If unused/unknown then set 0.
uFragLength
    PDU/Frag Length per header. Length of data starting at uOffset. Can exceed the size of the current PDU. Example, DCE RPC header claims there are 5800 bytes of data. Set uFragLength to 5800 bytes. This will cause DCE RPC to claim the next 5800 bytes of data from an underlying STREAM such as TCP. This only works on protocols such as TCP which are classified as STREAM.
ulSequence,
    Sequence number, if applies. Otherwise, set to 0.
ulID,
    ID, if applies. Otherwise, set to 0.
uPosFlags,

| | |
|---|---|
| SAR_FIRST, | First of multiple fragments in PDU. |
| SAR_MIDDLE, | Middle of multiple fragments in PDU. |
| SAR_LAST, | Last of multiple fragments in PDU. |
| SAR_ONLY, | Unfragmented data in PDU. |
| SAR_STREAM, | If a protocol is a STREAM. |
| SAR_HAS_A_HEADER | Set if protocol contains a valid header. | uProtoID
    Protocol ID of Protocol Interpreter which will be used to parse the data. For example, IP associates TCP/UDP . . . with re-assembled data.

The SarAddDu( ) API is called for all PDUs for which there is data. TCP, for example, does not call this function when the TCP segment contains no user data. This is so that in the event there are PDUs for multi-PDU data interspersed with PDUs for single-PDU data, the processing of all PDUs for any given circuit will be in a time-ordered manner. SarAddDu( ) allows PIs to delineate their data based on position (First/Middle/Last . . . ) and to associate a "next" protocol with it. For example, if the next protocol is UDP, the IP PI references IP.Data[0] with IP.Hdr.length bytes-IP header size bytes for each middle and last IP PDU and associates it with UDP. In the next pass, the IP Sequences are parsed and the UDP PDUs are re-assembled before the UDP PI is called.

A simple example based on the Microsoft SQL Server TDS protocol illustrates the use of the SarAddDu( ) API. In TDS, there is an 8 byte header which indicates the TDS command type, a status flag which indicates whether or not a given PDU is the last in a message (PDU), as well as a two byte field indicating the length of the PDU. Using two sample PDU, PDUs 148 and 150, there is response to a SQL query, which returns 30 rows of data spanning the two PDUs and consisting of 842 bytes of re-assembled data. Even though PDU 148 has 512 bytes of TDS data (indicated by the TCP layer), the first call to SarAddDu( ) uses SAR_FIRST because the status flag indicates that this PDU is not the last fragment of the TDS message. The second call to SarAddDu( ) for PDU 150, however, uses SAR_LAST, because the status flag indicates that it is the last PDU for the TDS message. In this example, the following call is made to SarAddDu( ):

```
SarAddDU(hInterp,    /* PIINTERP Handle              */
    uOffset,         /* Start at Data[0]. */
    0,               /* Total Length of PDU.      */
    uLength,         /* PDU/Frag Length per header. */
    0,               /* Sequence number, if applies  */
    0,               /* ID, if applies.              */
    uSarFlags,       /* FIRST, CONT, LAST            */
    PROTO_TDS);      /* Protocol ID to associate with Data.   */
```

In this call, uOffset is set to the first byte of the TDS header if the PDU is specified as SAR_FIRST, otherwise it is set to the start of the TDS data, even if there is a header on a continuation PDU. uLength is set to the total length specified by the TDS header. It should be noted that a request for more bytes in the call to SarAddDu( ) than are in the PDU will cause SAR to attempt to steal the extra bytes needed from subsequent PDUs.

SAR Sizes

The maximum PDU size in this present implementation is limited to 32 KBytes and the maximum size of the re-assembly buffer is 32 KBytes. There can be (2^32)-1 PDUs. PDU-1L (0xffffffff) is reserved for internal use. The maximum number of vectors displayed in a vector list is thirty-two. If there are more than thirty-two vectors, the first thirty-one vectors plus the last vector will be processed.

Error Handling

The present implementation of the SAR decode engine will recover out-of-sequence and duplicate frames at the data link layer. Out-of sequence frames are re-sequenced. When a duplicate, i.e., retransmitted, frame is detected, the SAR decode engine substitutes the most recent frame in time order for the earlier frame in the sequence. When a frame is missing, the SAR decode engine processes all frames up to the missing frame through all protocol layers. Truncated frames cause the SAR decode engine to terminate with an error message when the truncated frame is detected.

CONCLUSION

A segmentation and re-assembly (SAR) decode engine has been described. The SAR decode engine receives protocol data units from a communication channel between two computers, sequences the protocol data units, and re-assembles the data into the messages exchanged by the computers. The SAR decode engine is responsible for unpacking the payloads from the protocol data units as instructed by a protocol interpreter associated with the protocol data unit, and for creating and maintaining a flow object database containing flow objects representing the data flows at each protocol layer. Embodiments of the flow object database and the flow objects have been described, along with a software method executed by a computer acting as the SAR decode engine. Additionally, the particular characteristics of one implementation of the SAR decode engine have bee set forth.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. The terminology used in this application with respect to networks is meant to include all of network environments that use a layer protocol architecture. Therefore, it is manifestly intended that this invention be limited only by the following claims and equivalents thereof.

What is claimed is:

1. A computer system for analyzing a computer network, the computer system comprising:

means for capturing data units from a network communication channel between two or more additional computer systems;

means for creating a protocol flow object to represent each protocol layer used by the communications channel, each protocol flow object having a circuit element associated with each transmission direction in the channel;

means for arranging the protocol flow object in a logical tree structure that mirrors a hierarchy for the protocol layers;

means for creating circuit flow objects for each protocol layer to represent the protocol data units for the protocol layer immediately higher in the hierarchy, wherein the means for creating circuit flow objects further comprises:

means for creating circuit flow objects for the protocol flow objects at the bottom of the logical tree structure by extracting data from protocol data units for the protocol layer lowest in the hierarchy for the protocol layers; and means for creating circuit flow objects for protocol flow objects in the logical tree structure by extracting data from the circuit flow objects linked to the protocol flow object immediately lower in the tree structure;

means for associating a transmission direction with each circuit flow object;

means for linking each circuit flow object for a protocol layer to the circuit element of the representative protocol flow object that matches the transmission direction associated with the circuit flow object;

means for sequencing the circuit flow objects linked to a particular protocol flow object when specified by the protocol layer represented by the particular protocol flow object; and means for reassembling the messages from the circuit flow objects linked to the protocol flow object at the top of the tree structure.

2. The computer system of claim 1, wherein a circuit flow object comprises a vector list to represent fragmented data.

3. The computer system of claim 2, wherein a vector list comprises a vector specifying a protocol data unit number, a length value, and an offset value for each fragment of the fragmented data.

4. The computer system of claim 3 further comprising:
means for reassembling the fragmented data in accordance with the vectors in a vector list.

5. The computer system of claim 2 wherein the protocol flow objects are created in order from the bottom to the top of the hierarchy.

6. The computer system of claim 5, wherein the circuit flow objects for a current protocol flow object are created before creating the protocol flow object for the protocol layer immediately above the current protocol flow object in the hierarchy.

7. The computer system of claim 1 wherein the means for arranging the protocol flow objects into a logical tree structure further comprises:
means for creating multiple branches in the tree structure when a plurality of protocol layers are immediately above a current protocol layer in the hierarchy, each branch corresponding to one of the plurality of protocol layers.

8. The computer system of claim 1 further comprising:
means for determining the protocol layers in the hierarchy.

9. The computer system of claim 1 further comprising:
means for storing the protocol flow objects and the circuit flow objects in a flow object database.

10. A network analysis computer system comprising:
a processor;
a memory coupled to the processor through a bus;
a computer-readable medium coupled to the processor through the bus;
means for monitoring transmission of data units in a communications channel between two or more additional computer systems;
a plurality of protocol interpreters stored on the computer-readable medium for execution by the processor; and
a decode engine executed from the computer-readable medium to cause the processor to:
create protocol flow objects representing protocol layers, each protocol flow object having a circuit element associated with a transmission direction in the communications channel;
create circuit flow objects representing data flows at the protocol layers, each circuit flow object for a protocol layer linked to the circuit element for the representative protocol flow object that matches the transmission direction associated with the circuit flow object, wherein creating circuit flow objects comprises:
creating a circuit flow object for the protocol flow object at the bottom of a tree structure by extracting data from protocol data units for the protocol layer lowest in a hierarchy of the protocol layers; and
creating circuit flow objects for remaining protocol flow objects in the tree structure by extracting data from the circuit flow objects linked to the protocol flow object immediately lower in the tree structure;
extract data from the circuit flow objects representing protocol data units at a particular protocol layer as directed by one of the protocol interpreters;
sequence the circuit flow objects linked to a protocol flow object representing the protocol data units at a protocol layer as directed by one of the protocol interpreters; and
reassemble messages from the circuit flow objects linked to the protocol flow object at the top of the tree structure representing the protocol data units at a particular protocol layer if directed by one of the protocol interpreters.

11. The network analysis computer system of claim 10, wherein the decode engine further causes the processor to store the protocol flow objects and circuit flow objects in a flow database, logically link the protocol flow objects into a hierarchical tree structure, and to logically link the circuit flow objects to the protocol flow objects.

12. The network analysis computer system of claim 10, wherein the decode engine further causes the processor to create a circuit flow object as a vector list to represent fragmented data.

13. The network analysis computer system of claim 12, wherein the decode engine further causes the processor to create a vector list from a plurality of vectors, each vector specifying a protocol data unit number, a length value, and an offset value for a fragment of the fragmented data.

14. The network analysis computer system of claim 13, wherein the decode engine further causes the processor to reassemble the fragmented data in accordance with the vectors in a vector list.

* * * * *